H. BERRENS.
APPARATUS FOR EXTRACTING MERCURY FROM ITS ORES.
No. 172,691. Patented Jan. 25, 1876.
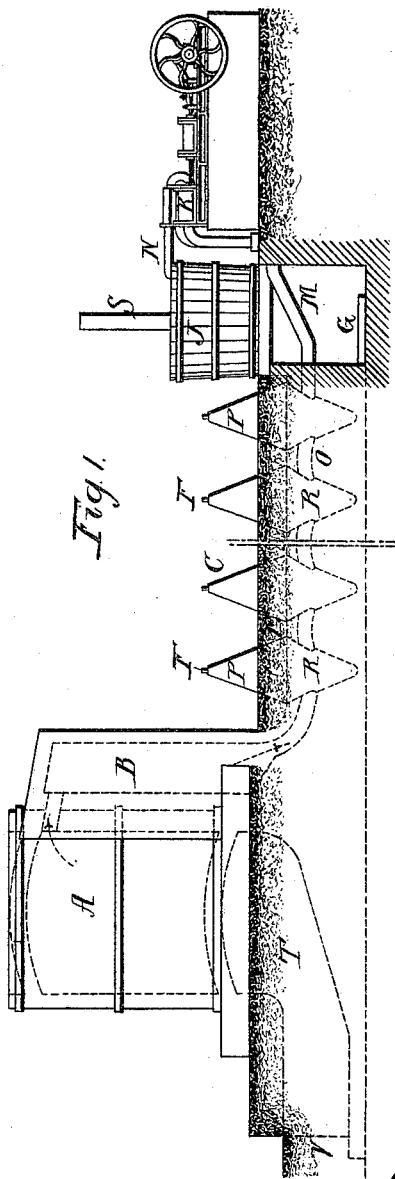

UNITED STATES PATENT OFFICE.

HIPPOLYTE BERRENS, OF BARCELONA, SPAIN.

IMPROVEMENT IN APPARATUS FOR EXTRACTING MERCURY FROM ITS ORES.

Specification forming part of Letters Patent No. 172,691, dated January 25, 1876; application filed December 17, 1875.

*To all whom it may concern:*

Be it known that I, HIPPOLYTE BERRENS, of Barcelona, Spain, have invented an Improved Process of and Apparatus for Extracting Mercury and other Volatile Metals from their Ores, of which the following is a specification:

The object of my invention is to subject the ores of mercury and similar volatile metals to such treatment that all the gases resulting from combustion will be, if possible, condensed, and none of the metal permitted to escape; and this object I attain in the manner which I will now proceed to describe, reference being had to the accompanying drawing, which illustrates the apparatus I employ for the above purpose.

Figure 1 is a longitudinal view; and Fig. 2, a transverse section on the line 1 2, Fig. 1.

A is a reverberatory furnace, T being the fire-place, and V the fuel-door. Communicating with the furnace, through an opening near the top, is a chamber, B, of any desired form, and this chamber communicates with a series of metal-receptacles, C. Each of these receptacles C is a condenser for the gases from the furnace, and is composed of two cone-shaped vessels, P R, placed base to base and united with luting, the top of the upper cone P being closed by a plug, F. The lower cones R are built in the ground, which serves to cool them thoroughly, while the upper cones are cooled by water contained in a space inclosed by the walls E. This water should, of course, be frequently renewed. Each of these vessels C, as well as the chamber B, is lined with powdered charcoal, mixed with a small proportion of cement for the purpose of insuring its adhesion.

The condensers C communicate with each other through pipes O, connecting the lower cones, and an air-pump, K, is in communication with the condensers through the medium of a pipe, M. A pipe, N, leads from this pump K to a vessel, J, filled with charcoal, and having an exit-flue, S.

The furnace being supplied with ore and the fire lighted, a draft is created by the pump K in the direction of the arrows, when the volatile products of the heated ore will pass through the chamber B and into the vessels C, where the gases are condensed, this condensation being greatly facilitated by the charcoal lining in the vessels.

In case all the condensable gases should not have been collected in the condensers, they are finally passed through the bed of charcoal in the vessel J, and the remaining gases make their exit through the flue S into the atmosphere. In practice, however, I have not found the slightest trace of mercury in this vessel J, all the mercury being thoroughly condensed in the vessels C.

The condensers are emptied by removing the upper cones from the lower ones and cleaning them by means of water.

The mercury and water may, if desired, be recovered by means of gutters leading to a receptacle, G.

By employing a pump, K, the draft can be regulated at pleasure, and the ordinary chimneys, by which a considerable quantity of the mercurial gases is apt to escape, are dispensed with.

It is well known that great waste is usually experienced in extracting mercury from the ore; but with my process there is found to be no appreciable waste at all, for I effect condensation, not only of the mercury, sulphurous acid, and bituminous matter, according to the mineral under treatment, extracted from the ore, but also the steam and tar resulting from combustion, and as the steam is decomposed during the process, the oxygen and one-half of the hydrogen combine with the sulphurous acid, and form sulphuric acid while the remaining half of the hydrogen acts as a powerful reducing agent on the ore.

I claim as my invention—

1. As an improvement in extracting mercury and similar volatile metals from their ores, the process of subjecting the gases of combustion to the condensing influence of charcoal, as set forth.

2. A condenser, C, composed of two conical vessels, P R, cemented together base to base, and lined with charcoal, as set forth.

3. A condenser, C, the lower portion of which is built in the ground, and the upper portion arranged to be surrounded by water, substantially as and for the purpose described.

In testimony whereof I have signed my name to this specification in the presence of two subscribing witnesses.

HIPPOLYTE BERRENS.

Witnesses:
NAPOLEON MARIGNAE,
VICTOR FUNARO.